United States Patent [19]

Sasakawa

[11] 4,435,036
[45] Mar. 6, 1984

[54] OPTICAL FIBER CONNECTOR WITH MUTUALLY ENGAGING, OPPOSITELY TAPERED SURFACES

[75] Inventor: Tomio Sasakawa, Tokyo, Japan

[73] Assignee: Anritsu Electric Company Limited, Tokyo, Japan

[21] Appl. No.: 267,966

[22] Filed: May 27, 1981

[30] Foreign Application Priority Data

May 30, 1980 [JP] Japan ................... 55-71454

[51] Int. Cl.³ .............................................. G02B 7/26
[52] U.S. Cl. ............................................. 350/96.20
[58] Field of Search ..................... 350/96.20, 96.21

[56] References Cited

U.S. PATENT DOCUMENTS

| | | | |
|---|---|---|---|
| 4,168,109 | 9/1979 | Dumire | 350/96.22 |
| 4,186,998 | 2/1980 | Holzman | 350/96.21 |
| 4,208,095 | 6/1980 | Malsot | 350/96.21 |
| 4,209,227 | 6/1980 | Dubos et al. | 350/96.22 |
| 4,268,115 | 5/1981 | Slemon et al. | 350/96.21 |
| 4,330,172 | 5/1982 | Monaghan et al. | 350/96.21 |
| 4,362,356 | 12/1982 | Williams et al. | 350/96.20 |

FOREIGN PATENT DOCUMENTS

| | | | |
|---|---|---|---|
| 52-9451 | 1/1977 | Japan | 350/96.21 |
| 2040062 | 8/1980 | United Kingdom | 350/96.20 |

*Primary Examiner*—John D. Lee
*Assistant Examiner*—Frank González
*Attorney, Agent, or Firm*—Jordan and Hamburg

[57] ABSTRACT

An optical fiber cable connecting device for connecting an optical fiber cable to a connector having a receptacle, which device comprises a fiber cable guide member including a fiber fixing portion for fixing said fiber cable, and a pressuring member including a locking portion having a tapered portion cooperating with an oppositely tapered portion of the fiber fixing portion such that when said locking portion is held in one position relative to said fixing portion, said fixing portion locks said fiber cable in a fixed place whereas when said locking portion is held out of said one position, said fixing portion releases said fiber cable.

3 Claims, 7 Drawing Figures

OPTICAL FIBER CONNECTOR WITH MUTUALLY ENGAGING, OPPOSITELY TAPERED SURFACES

BACKGROUND OF THE INVENTION

This invention relates to an optical fiber cable connecting device and, more particularly, to an optical fiber cable connecting device that enables an optical fiber cable to be connected to an ordinary connector in a simple manner.

It is sometimes desired to measure optical fiber characteristics such as fiber loss using an optical power meter. In such case a connecting device is employed to connect the optical fiber to a sensor which forms part of the optical power meter. An example of a conventional connecting device is illustrated in FIGS. 1A, 1B and 1C. Attached to the sensor, denoted at numeral 10, is a connector 14 which permits the connection of a fiber cable plug 12. Such is the arrangement for ordinary use. To connect an optical fiber cable 16 directly to the sensor 10, however, the connector 14 is detached and replaced by a special connector 18 that enables the connection of a connecting device 20. The latter is so constructed as to grasp the optical fiber cable 16 between fixing portions 22 and 24. Specifically, the fixing portion 22 has a V-shaped channel 26 for receiving the optical fiber cable 16, a retaining member 28 consisting of a spring for retaining the optical fiber cable 16 in the V-shaped channel 26, and a V-shaped channel 30 which is a continuation of the V-shaped channel 26 for receiving solely the bare fiber 16a of the optical fiber cable 16. The fixing portion 22 further includes a fitting portion 32 constituting a unitary body with the extremity 22a of the fixing portion 22 in order to permit the latter to be plugged into the receptacle 18a of the special connector 18, and a magnet 34b which, when the optical fiber cable 16 has been inserted between the fixing portions 22 and 24, is attracted to a magnet 34a provided on the fixing portion 24 in order to hold the fiber cable firmly in place.

The connecting device having the foregoing construction requires the provision of the special connector for the connection to the sensor. This means that a worker must go to the trouble of attaching and detaching the connector as the case requires. Another problem which is encountered relates to the V-shaped channels that receive the optical fiber cable and bare fiber when the latter are clamped within the connecting device. Specifically, and particularly with regard to the V-shaped channel that receives the bare fiber, it is extremely difficult to retain the bare fiber firmly within the V-shaped channel without any displacement in its optical axis because the bare fiber is available in two diameters of 125 and 150 microns. Any displacement in the optical axis will cause an increase in the spot size projected on the surface of the sensor as well as an increase in the error of low-input level measurements. Still another disadvantage of the conventional connecting device is its large size which is necessitated by the fact that the optical fiber cable is held in place by the clamping-type arrangement.

SUMMARY OF THE INVENTION

The present invention seeks to eliminate the shortcomings encountered in the prior art and provides a compact, light-weight optical fiber connecting device having two continuous insertion bores for receiving the optical cable and the bare fiber which are passed therethrough, the arrangement being such that the optical fiber cable can be connected to an ordinary connector by inhibiting the insertion and withdrawal of the fiber cable within the device.

DETAILED DESCRIPTION OF PREFERRED EMBODIMENTS

Figure 1A:
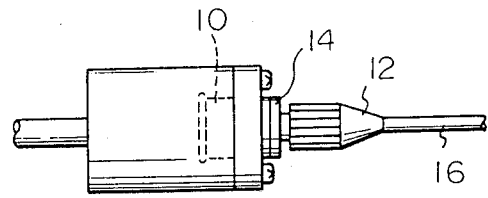
FIGS. 1A to 1C show an example of a prior art optical fiber cord connecting device.
Figure 1B:
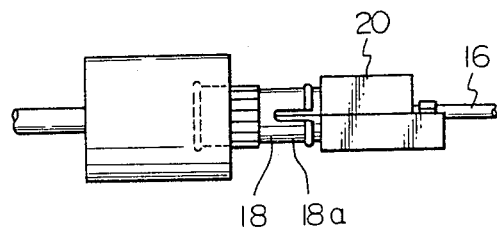
Figure 1C:
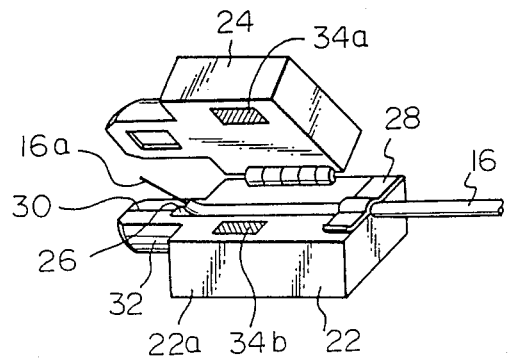
Figure 2:
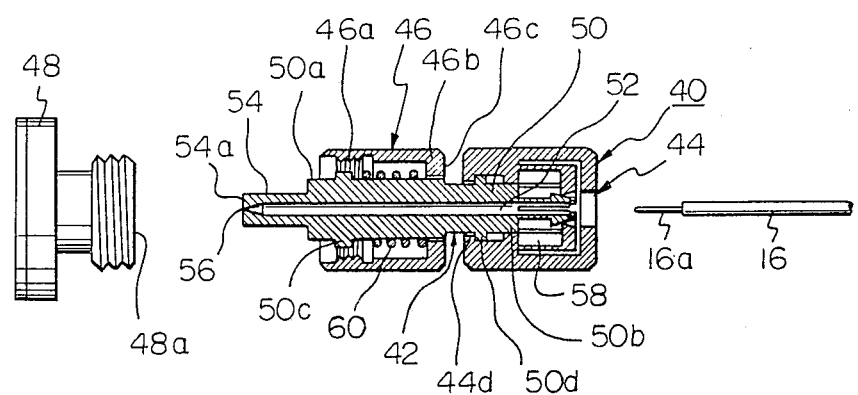
FIG. 2 shows a first preferred embodiment of an optical fiber cable connecting device according to the present invention.
Figure 3A:
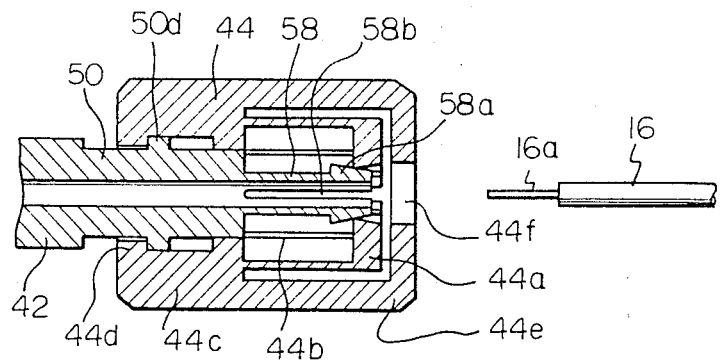
FIGS. 3A and 3B are partially enlarged views of the first embodiment shown in FIG. 2.
Figure 3B:
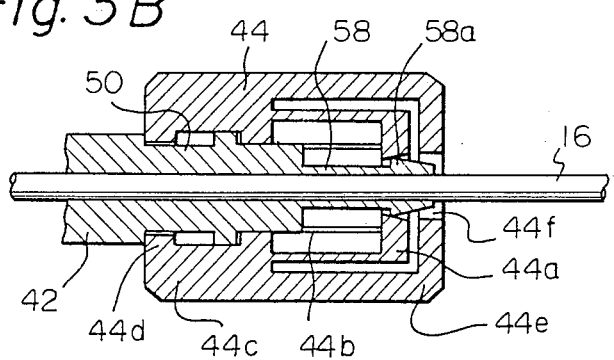

The present invention will now be described with reference to FIG. 2 showing a first preferred embodiment of an optical fiber cable connecting device according to the present invention. In FIG. 2, an optical fiber cable connecting device 40 comprises a fiber cable guide member 42 and a pressuring member 44 slidably provided on one end of the fiber cable guide member 42. The optical fiber cable connecting member 40 further comprises a coupling member 46 provided on another end of the optical fiber cable guide member 42 to couple the latter to a connector 48. The guide member 42 has a fiber insertion portion 50 formed with an insertion bore 52 for receiving an inserted optical fiber cable 16. A fitting portion 54 forms a unitary body with one end 50a of the fiber insertion portion 50. The tip portion 54a of the fitting portion 54 has a conical insertion bore 56 for receiving an inserted bare fiber 16a, the conical bore 56 being a continuation of the bore 52. The fitting portion 54 is adapted to be plugged into the receptacle 48a of the connector 48. A fiber fixing portion 58 forms a unitary body with the end 50b of the insertion portion 50 and is adapted to surround the optical fiber cable 16 and to fix the cable by inhibiting its insertion and withdrawal. The fiber insertion portion 50, fitting portion 54 and fiber fixing portion 58 constitute the fiber cable guide member 42. A pressuring portion 44 is, in this example, so constructed as to surround the fiber fixing portion 58 and, while in such state, to pressure the optical fiber cable 16 and then to lockably engage with the fiber fixing portion 58. The fiber fixing portion 58 and pressuring portion 44 are shown in greater detail in the partially enlarged views of FIGS. 3A and 3B, FIG. 3A showing the optical fiber cable before it is fixed in the connecting device, and FIG. 3B showing the optical fiber cable after it is fixed in the device. Here a locking portion 58a is cylindrically formed so as to surround the optical fiber cable 16, and is endowed with resiliency owing to a plurality of slits 58b which are provided in the circumferential wall thereof. The outer diameter of the locking portion 58a decreases toward the direction from which the optical fiber cable 16 is inserted so that the locking portion 58a tapers toward said direction. A locking portion 44a is cylindrically formed so as to surround the locking portion 58a, and is endowed with resiliency owing to a plurality of slits 44b which are provided in the circumferential wall thereof. The inner diameter of the locking portion 44b decreases away from the direction of optical fiber cable insertion so that the inner circumferential portion of the locking portion 44a is tapered in a direction opposite to that of the locking portion 58a. The locking portions 58a, 44a therefore are in abutting contact with each other. The pressuring portion 44 has, at the end portion 44c thereof, an engaging portion 44d which allows the pressuring portion 44 to fit on and to slide loosely along the fiber insertion portion 50 in the fiber cable insertion and withdrawal direction without separating from the fiber guide member 42. Thus, moving the pressuring portion in the direction of fiber cable insertion causes the fiber fixing portion 58 to come into pressured contact with the optical fiber cable 16. The end portion 44e of the pressuring portion 44 has an insertion aperture 44f into which the optical fiber cable 16 is inserted. The coupling member 46 has an end portion 46a equipped with threads that couple the coupling member 46 to the connector 48 as the coupling portion is rotated, thereby to mate the fitting portion 54 with the connector 48. The coupling portion 46 includes also an end portion 46b having an engaging portion 46c which allows the coupling portion 46 to slide loosely along the fiber insertion portion 50 in the fiber cable insertion and withdrawal directions without separating from the fiber guide member 42.

A resilient member 60 is interposed between the engaging portion 46c and a stopper 50c. When the coupling member 46 is coupled to the connector 48, the resilient member 60 perfects the mating engagement between the fitting portion 54 and the receptacle 48a of the connector 48 and protects the tip 54a of the fitting portion 54. The stopper 50d abuts against the engaging portion 44d to prevent the pressuring portion 44 from coming off the fiber guide member 42.

Figure 4:
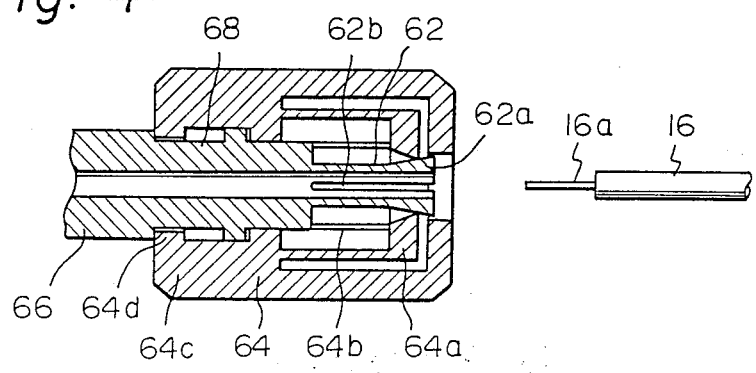
FIG. 4 shows a second preferred embodiment of an optical fiber cable connecting device according to the present invention.

FIG. 4 illustrates a second preferred embodiment of a fiber cable connecting device according to the present invention. In FIG. 4, a locking portion 62a of the fiber fixing portion 62 is cylindrically formed so as to surround the optical fiber cable 16, and is endowed with resiliency owing to a plurality of slits 62b which are provided in the circumferential wall thereof. The outer diameter of the locking portion 62a is so dimensioned that the locking portion tapers in a direction which is opposite to that from which the optical fiber cable 16 is inserted.

The locking portion 64a of a pressuring member 64 is cylindrically formed so as to surround the locking portion 62a, and is endowed with resiliency owing to a plurality of slits 64b which are provided in the circumferential wall thereof. The inner diameter of the locking portion 64a decreases toward the direction from which the optical fiber 16 is inserted, so that the inner circumferential portion of the locking portion 64a tapers toward the optical fiber insertion direction. The locking portions 62a, 64a therefore are in abutting contact which each other. The pressuring member 64 has, at the end portion 64c thereof, an engaging portion 64d which allows the pressuring portion 64 to fit on and to slide loosely along the fiber insertion portion 66 in the fiber cable insertion and withdrawal directions without separating from the fiber guide member 68. Thus, moving the presuring member 64 in the direction of fiber cable withdrawal causes the fiber fixing portion 62 to come into pressured contact with the optical fiber cord 16.

Thus, the arrangement described above includes a fiber guide member and a pressuring member. The fiber guiding portion has a fiber insertion portion into which the optical fiber cable is inserted, a fitting portion into which the bare fiber is inserted and which is plugged into the connector receptacle, and a fiber fixing portion which fixes the optical fiber cable by inhibiting its insertion and withdrawal. The pressuring member causes the fiber fixing portion to come into pressured contact with the optical fiber cable. Such an arrangement allows a reduction in the diameter of the bare fiber insertion bore so that displacement of the optical axis can be greatly diminished. It also simplifies the insertion of the optical fiber cable and permits the inserted optical fiber cable to be retained and secured against movement in the directions of insertion and withdrawal by bringing pressure to bear against the inserted optical fiber cable. In addition, the connecting device of the present invention may serve as a general-purpose connecting device since it can be connected to an ordinary connector without requiring the use of special connectors.

While a coupling member for coupling the device to the connector was provided in the foregoing embodiments, the coupling member may be dispensed with if the fitting portion into which the fiber core is inserted is merely to be plugged into the connector receptacle. Furthermore, although the hole for insertion of the optical fiber cable is provided in the end of the pressuring member, the hole may be dispensed with. It should also be noted that the construction for fixing the optical fiber cable by inhibiting its movement in the directions of insertion and withdrawal is not limited to that described in the embodiments. In other words, modifications in the construction are possible without departing from the spirit and scope of the invention.

What is claimed is:

1. A fiber optic cable connecting device for connecting a fiber optic cable to a connector having a receptacle, comprising:

a fiber optic cable guide member including a fiber insertion portion having a first insertion bore for receiving said fiber optic cable, a fitting portion integral with said fiber insertion portion for being plugged into said receptacle, said fitting portion having a tip portion formed with a second insertion bore communicating with said first insertion bore for receiving a bare fiber of said fiber optic cable and a fiber fixing portion integral with said fiber insertion portion for fixing said fiber optic cable, said fiber fixing portion including a locking portion, with the outer surface of said locking portion being tapered along the direction of the axis of said fiber insertion guide member; and a pressuring member slidably disposed on said fiber insertion portion for movement within a restricted range in said axial direction, said pressuring member being provided with a locking portion having an aperture formed therein to receive said locking portion of said fiber insertion portion, said aperture having the inner surface thereof tapered in the opposite direction to that of said locking portion of said fiber insertion portion, said locking portions of said fiber insertion portion and pressuring member being disposed to mutually abut such as to cooperate in fixing said fiber optic cable within said locking portion of said fiber insertion portion when said pressuring member is moved to one end of said range of axial movement and to release said fiber optic cable when said pressuring member is moved to the other end of said range.

2. A fiber optic connecting device according to claim 1, and further comprising a coupling member disposed on said fiber insertion portion and including means engageable with said receptacle to couple said connecting device to said connector.

3. A fiber optic connecting device according to claim 1, in which at least one of said locking portions of said fiber insertion portion and pressuring member is rendered resilient by a plurality of axial slits formed therein.

* * * * *